United States Patent
Caine

(10) Patent No.: US 9,480,088 B2
(45) Date of Patent: *Oct. 25, 2016

(54) METHOD AND APPARATUS FOR CONFIGURING A PORTABLE ELECTRONIC DEVICE BY A PHYSICAL INTERACTION

(71) Applicant: Logitech Europe S.A, Lausanne (CH)

(72) Inventor: Xavier Caine, San Jose, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,903

(22) Filed: Mar. 17, 2015

(65) Prior Publication Data

US 2016/0278133 A1    Sep. 22, 2016

(51) Int. Cl.
| | |
|---|---|
| G08B 13/00 | (2006.01) |
| H04W 76/02 | (2009.01) |
| H04W 4/02 | (2009.01) |
| H04B 17/318 | (2015.01) |
| H04W 4/00 | (2009.01) |

(52) U.S. Cl.
CPC .......... *H04W 76/02* (2013.01); *H04B 17/318* (2015.01); *H04W 4/001* (2013.01); *H04W 4/027* (2013.01)

(58) Field of Classification Search
USPC .............. 455/456.1, 556.1, 41.2, 418, 404.1, 455/425, 456.4, 419, 1, 517, 456.6; 345/158, 173, 156, 163, 165, 166
See application file for complete search history.

(56) References Cited

U.S. PATENT DOCUMENTS

| | | | | |
|---|---|---|---|---|
| 7,317,448 B1* | 1/2008 | Sasselli | ................. | G06F 3/0317 345/163 |
| 2008/0309508 A1* | 12/2008 | Harmon | ................ | G06F 1/1626 340/686.1 |
| 2009/0201152 A1* | 8/2009 | Karr | .......................... | G01S 5/14 340/545.6 |
| 2010/0149030 A1* | 6/2010 | Verma | ................ | G08B 13/1436 342/357.64 |
| 2012/0113002 A1* | 5/2012 | Plestid | .................... | G06F 3/012 345/158 |
| 2013/0234853 A1* | 9/2013 | H. Kazerouni | .... | G08B 13/1427 340/572.1 |
| 2014/0162681 A1* | 6/2014 | Noonan | ................ | H04W 4/021 455/456.1 |
| 2014/0277642 A1 | 9/2014 | Anderson et al. | | |
| 2015/0295661 A1* | 10/2015 | Huang | ................... | G08C 23/04 398/202 |

* cited by examiner

*Primary Examiner* — Ganiyu A Hanidu
(74) *Attorney, Agent, or Firm* — Patterson & Sheridan LLP

(57) ABSTRACT

Embodiments disclosed herein generally include a system and a method of causing an electronic device to perform one or more desirable functions or processes based on the physical movement of the electronic device. In one embodiment, the physical movement of a first electronic device is part of a physical interaction process completed between a first electronic device and a second electronic device. The information gained from at least the physical movement part of the physical interaction process can then be used to cause at least the first electronic device to perform one or more desirable functions or processes. Some aspects of the disclosure provided herein may include an apparatus, method and/or computing device software application that is configured to more easily setup and reliably control an electronic device based on the physical movement of the electronic device and/or the interaction of the electronic device with another electronic device.

27 Claims, 3 Drawing Sheets

METHOD AND APPARATUS FOR CONFIGURING A PORTABLE ELECTRONIC DEVICE BY A PHYSICAL INTERACTION

BACKGROUND OF THE INVENTION

1. Field of the Invention

Embodiments disclosed herein generally relate to an electronic device that is configured to perform a desired function based on input received from a user.

2. Description of the Related Art

The popularity of portable electronics, such as smart phones, touch pads, PDAs, portable computers, wireless keyboards, wireless mice, wireless speakers, gaming controllers and portable music players, has increased dramatically in the past decade. As people have become more reliant on electronic devices, they have found more and more uses in the home, business and mobile environments.

As the development of software applications that run on today's electronic devices have improved, the usefulness and our reliance on these types of electronic devices have increased. To improve the usefulness of an electronic device, it is common to connect a first electronic device to one or more electronic devices, so that the first electronic device can perform, or better perform, functions that are typically outside the first electronic device's main function. For example, to improve a user's audio experience it is often desirable to link one or more portable speakers and an audio source, such as a music player or smart phone, together to provide a richer and enveloping audio experience. However, due to limitations in standard wireless communication protocols and device software, it is a non-trivial task to setup and control the communication between these electronic devices.

Therefore, there is need for a method and apparatus that allows electronic devices to be automatically and seamlessly configured to allow the devices to rapidly provide desirable information to the user and to avoid the above-mentioned problems. There is also a need for a software application and a control method that allows an electronic device to be easily controlled by the delivery of simple input(s) received from a user.

SUMMARY OF THE INVENTION

Embodiments disclosed herein generally include a system and a method for controlling an electronic device based on the user's physical movement of the electronic device. In some embodiments, the physical movement of a first electronic device is performed during a physical interaction process, which causes at least the first electronic device to perform one or more desirable functions or processes. The desirable function or process performed by the first electronic device is typically completed by software applications running on the portable device, and may include causing the first electronic device to operate in a desired way and/or to perform one or more desired activities after the physical interaction process has been performed on the first electronic device.

Embodiments disclosed herein provide an electronic device, comprising a processor, a first sensor that is configured to generate a first signal when the electronic device is moved in a first direction, wherein the first signal comprises movement parameter information, and a memory having stored therein a number of instructions. The number of instructions which, when executed by the processor, causes the electronic device to perform operations comprising receiving the first signal from the first sensor, comparing the first signal with a device control rule, and initiating or altering an operation performed by the electronic device based on information generated by the comparison of the first signal with the device control rule. The electronic device also having a second sensor that is configured to generate a second signal when the electronic device is moved in a second direction, wherein the second signal comprises information related to a movement parameter that is detected by the second sensor, and the second direction is at an angle to the first direction. The movement parameter information may include information relating to an acceleration of the electronic device in the first direction.

Embodiments disclosed herein provide an electronic device comprising a processor, a transceiver, a first sensor that is configured to generate a first signal when the electronic device is moved in a first direction and a memory. The first signal generated by the first sensor may comprise movement parameter information, The memory having stored therein a number of instructions which, when executed by the processor, causes the electronic device to perform operations comprising comparing the first signal, received from the first sensor, with a device control rule, initiating or altering an operation performed by the electronic device based on information generated by the comparison of the first signal with the device control rule, and transmitting a device control signal, using the transceiver, to an external electronic device, wherein the device control signal is derived from information generated by the comparison of the first signal with the device control rule.

Embodiments disclosed herein may further provide a method of controlling an electronic device comprising receiving a first signal from a first motion sensor, wherein the first signal comprises information relating to a movement parameter that has a magnitude in a first direction, defining a device control process instruction based on a comparison of the information in the first signal and a device control rule, and initiating or altering a process performed by the first electronic device based on the defined device control process.

Embodiments disclosed herein may further provide a method of controlling an electronic device, comprising receiving, by a processor, a first signal from a first motion sensor, wherein the first signal comprises information relating to a movement parameter that has a magnitude in a first direction, defining a device control process instruction based on a comparison of the information in the first signal and a device control rule, initiating or altering a process performed by the electronic device based on the defined device control process instruction, and transmitting, by a transceiver, a device control signal to an external electronic device, wherein the device control signal is derived from information generated by the comparison of the first signal with the device control rule.

Embodiments disclosed herein provide a method of controlling an electronic device comprising sensing a first movement of a first electronic device using a first sensor, wherein the sensed first movement comprises detecting a magnitude of the first movement in a first direction. Next, receiving information relating to the sensed first movement, sensing a second movement of the first electronic device using the first sensor, wherein the sensed second movement comprises detecting a magnitude of the second movement in the first direction, and receiving information relating to the sensed second movement. Next, defining a device control process based on a comparison of the information received from the first and second movements and a device control rule, and initiating or altering a process performed by the first electronic device based on the defined device control process derived from the comparison.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
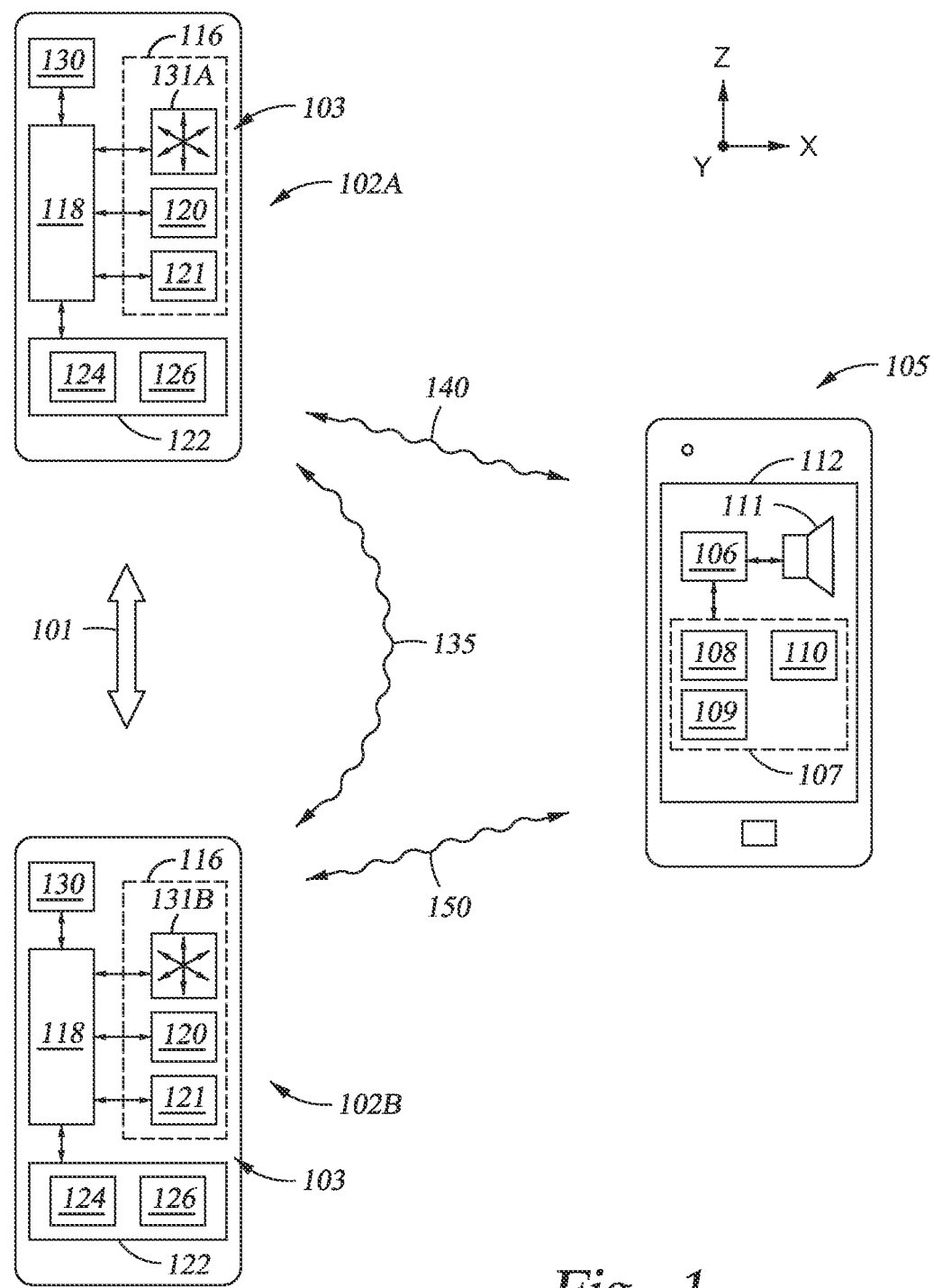
FIG. 1 schematically illustrates two electronic devices that have been caused to interact with each other, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the embodiments of the present disclosure. However, it will be apparent to one of skill in the art that one or more of the embodiments of the present disclosure may be practiced without one or more of these specific details. In other instances, well-known features have not been described in order to avoid obscuring one or more of the embodiments of the present disclosure.

Embodiments disclosed herein generally include a system and a method of causing an electronic device to perform one or more desirable functions, operations or processes based on the physical movement of the electronic device. In one embodiment, the physical movement of a first electronic device is part of a physical interaction process that is performed on a first electronic device, or performed on both a first electronic device and a second electronic device. The information gained from at least the physical movement part of the physical interaction process causes at least the first electronic device to perform one or more desirable functions, operations or processes, which may include altering the way software currently or subsequently running on the electronic device interacts with or provides input to a user. In some embodiments, the electronic device responds differently when it is caused to interact with differently configured electronic devices and/or is physically moved in a different ways. Some aspects of the disclosure provided herein include an apparatus, method and computing device software application that are configured to more easily setup and reliably control an electronic device based on the physical movement of the electronic device and/or the interaction of the electronic device with another electronic device. In some embodiments, the apparatus and methods include a first electronic device that can determine and provide information about a type of task that is desired to be performed by a second electronic device based on the physical movement of the first electronic device.

FIG. 1 is a schematic diagram that illustrates two electronic devices, such as electronic device 102A and electronic device 102B that are each configured to interact with each other, and in some cases with a secondary device 105. In general, the electronic devices 102A and 102B can be computing devices that can be used with other wireless or wired electronic devices. In one example, the electronic device 102A, electronic device 102B and the secondary device 105 are able to communicate with each other over wireless communication links, such as communication links 135, 140 and 150.

During operation, when the electronic device 102A is physically moved in a prescribed way, components in the electronic device 102A sense the movement and based on information derived from the sensed movement, the electronic device 102A is able to alter or adjust one or more operating functions or processes that are subsequently performed. In one embodiment, the movement of the electronic device 102A is also sensed by the electronic device 102B due to a user causing both of the electronic devices 102A and 102B to physically interact. In this case, one or more electronic components in the electronic device 102A and electronic device 102B sense the movement of the electronic device 102A, and based on information derived from the sensed movement by each electronic device 102A, 102B, the electronic devices 102A and 102B are each able to alter or adjust one or more functions or processes that are subsequently performed by one or both of the electronic devices 102A, 102B.

In general, an electronic device 102, such as electronic device 102A or electronic device 102B as shown in FIG. 1, may be any technically feasible electronic device that is configured to communicate and/or interact with another electronic device. In general, the electronic device 102 can be any type of electronic device, such as a mouse, keyboard, wireless speaker, PDA, electronic stylus, home automation device, remote control device, cell phone (e.g., smart phone), a tablet computing device, laptop computer, an e-book reader, a portable music player, or other similar electronic device. Examples of electronic devices 102 may include, but are not limited to an Ultimate Ears Boom™, Harmony™ remote, Logitech® keyboard, Logitech® mouse, iPod®, iPhone®, iPad®, Android™ phone, Samsung phone, Samsung Galaxy®, Squeeze™ box, Microsoft Surface®, laptop or other similar device. The electronic devices 102 may also be configured to communicate and/or interact with the secondary device 105. In some configurations the secondary device 105 may be in communication with or form part of a larger system, such as home or commercial audio system, automobile, home automation system, or other similar system. In practice, an electronic device 102 may be battery-operated, although these devices may receive power from a wall outlet, wireless charger or other similar devices without deviating from the basic scope of the disclosure provided herein. In general, an electronic device 102 may comprise a device that has the capability of storing, processing and delivering information to another electronic device so that the electronic device can perform some useful function and/or interact with a user.

An electronic device 102 may include electrical components 103 that comprise a processor 118 coupled to input/output (I/O) devices 116, a power source 130 and a memory unit 122. Memory unit 122 may include one or more software applications 124 and stored media data 126. Processor 118 may be a hardware unit or combination of hardware units capable of executing software applications and processing data. In some configurations, the processor 118 includes a central processing unit (CPU), a digital signal processor (DSP), an application-specific integrated circuit (ASIC), and/or a combination of such units. Processor 118 is generally configured to execute the one or more software applications 124 and process the stored media data 126, which are each included within memory unit 122.

The I/O devices 116 are coupled to memory unit 122 and processor 118, and may include devices capable of receiving input and/or devices capable of providing output. The I/O devices 116 include one or more sensors 131 that are configured to sense the movement of the electronic device 102, and also provide the sensed movement information to the processor 118. The one or more sensors 131, which are labeled 131A in the electronic device 102A and labeled 131B in the electronic device 102B in FIG. 1, may be any device that is able to at least detect or sense the movement of the electronic device 102 in which it is positioned. In some configurations, the sensors 131 are devices that are able to sense a movement parameter, or "movement" as also used herein, and may be selected from a group consisting of an acceleration vector imparted on the electronic device 102 at an instant in time, the velocity vector of the electronic device 102 at an instant in time, the relative displacement vector of the electronic device 102 from one position to another, and a jerk vector imparted on the electronic device 102 at an instant in time. In one example, the sensors 131 may be an accelerometer, load/force sensor, seismometer, position sensor (e.g., LVDT), pendulous integrating gyroscopic accelerometer (PIGA), or other useful motion sensing device.

The I/O devices 116 may also include one or more transceivers 120 that are configured to establish one or more different types of wired or wireless communication links with other transceivers residing within other computing devices, such as a transceiver within the I/O devices 116 of another electronic device, such as electronic device 102B, or a processing system 106 of the secondary device 105. A given transceiver 120 within I/O devices 116 could establish, for example, a Wi-Fi communication link, near field communication (NFC) link or a Bluetooth® communication link (e.g., BTLE, Bluetooth classic), among other types of communication links with similar components in the electronic device 102B or the secondary device 105.

The I/O devices 116 may also include one or more timing devices, such as a clock (not shown), that are configured to provide time related information to the processor 118. The one or more timing devices may be used to determine if the physical movement of a first electronic device is intended to cause the alteration of a process being performed by a second electronic device, based at least partially on whether the detected physical movement of the first electronic device occurred within a predetermined time interval. The clock may be a simple IC or similar component, such as a crystal oscillator. In some configurations, the processor 118 may be in communication with the clock to aid in the analysis and synchronization of data transferred between components within the electronic device 102. However, in some configurations, the processor 118 and the clock in multiple electronic devices are used to determine if a sensed physical movement was an activity that was intended to cause the electronic device to perform some subsequent desired function, as is further discussed below. Also, in some cases, to determine whether a sensed physical movement, or whether a signal received from an electronic device that sensed a physical movement, was intended to be received by a receiving electronic device, timing data (e.g., timestamp data) may be transferred with other interaction related data between the electronic devices. The transferred timing data, and/or other interaction related data, may be compared with the receiving electronic device's sensed physical movement, or lack thereof, to determine if the receiving electronic device is to perform some subsequent desired function.

The processor 118 in each electronic device may also use the timing data received in the transferred data to continually update the processes running therein, in an effort to account for any drift or difference in the timing found between the electronic devices. Therefore, in one embodiment, all communications provided between the electronic devices will include the latest time information so that the receiving electronic device can synchronize activities with the transmitting electronic device and/or can continually correct for timing errors found within the devices.

Memory unit 122 may be any technically feasible type of hardware unit configured to store data. For example, memory unit 122 could be a hard disk, a random access memory (RAM) module, a flash memory unit, or a combination of different hardware units configured to store data. Software application 124, which is stored within the memory unit 122, includes program code that may be executed by processor 118 in order to perform various functionalities associated with the electronic device 102.

The stored media data 126 may include any type of information that relates to a desired control parameter, user data, electronic device configuration data, device control rules or other useful information, which are discussed further below. The stored media data 126 may include information that is delivered to and/or received from another electronic device, such as the secondary device 105. The software application 124 may generate wireless control signals based on information found in the stored media data 126. The stored media data 126 may reflect various data files, settings and/or parameters associated with the environment, device control rules and/or desired behavior of the electronic devices 102A, 102B. As mentioned above, software applications 124 may configure the electronic device 102A, 102B based on stored media data 126.

In some embodiments, the I/O devices 116 may further include a wireless signal strength comparison device 121 that is adapted to detect the signal strength of one or more wireless signals that are received by a transceiver 120 in the electronic devices 102A, 102B. The signal strength may be determined using a received signal strength indicator (RSSI) technique, a received channel power indicator (RCPI) technique, techniques that use travel time measurements (ToAs) or other similar signal strength detection technique. The signal comparison device may also include one or more analog or digital comparison circuits (e.g., OP Amps), and at least one feedback circuit that is able to provide the processor 118 with information about the wireless signals received by the electronic devices 102A, 102B. In one example, the wireless signal strength comparison device can be used to determine the relative power levels of two or more wireless signals that have been received by a first electronic device 102A from two or more electronic devices, such as the electronic device 102B and the secondary device 105 during operation. In one configuration, the electronic device 102A can use the signal strength comparison information to determine which device is closer in proximity and use the information to decide which electronic device it should communicate with going forward.

The secondary device 105 can be any type of electronic device, such as a cell phone (e.g., smart phone), a tablet computing device, laptop computer, an e-book reader, a portable music player, or other similar electronic device. Examples of the secondary device 105 may include, but are not limited to an iPod®, iPhone®, iPad®, Android™ phone, Samsung phone, Samsung Galaxy®, Squeeze™ box, Microsoft Surface®, laptop or other similar device. The secondary device 105 may comprise a display device, a processing system 106 and memory 107. The memory 107 may contain stored data 108 and one or more software programs, such as programs 109 and 110. The processing system 106 will typically comprise a central processing unit (CPU), a digital signal processor (DSP), application-specific integrated circuits (ASIC), an input/output (I/O) device, a visual display, a timing device (e.g., clock) and other useful components. The I/O devices within the secondary device 105 may include a speaker 111 and/or one or more transceivers (not shown) configured to establish a wired or wireless communication link with other transceivers residing within other computing devices, such as the transceiver 120. The software applications, or programs 109 and 110, may include software applications that are configured to run in the foreground or background on the primary portable devices 105. The software applications are used to control one or more activities being performed by the secondary device 105 and/or provide some useful input to the user via audio or visual means provided by the primary portable devices 105.

Electronic Device Configuration Method Examples

Figure 2:
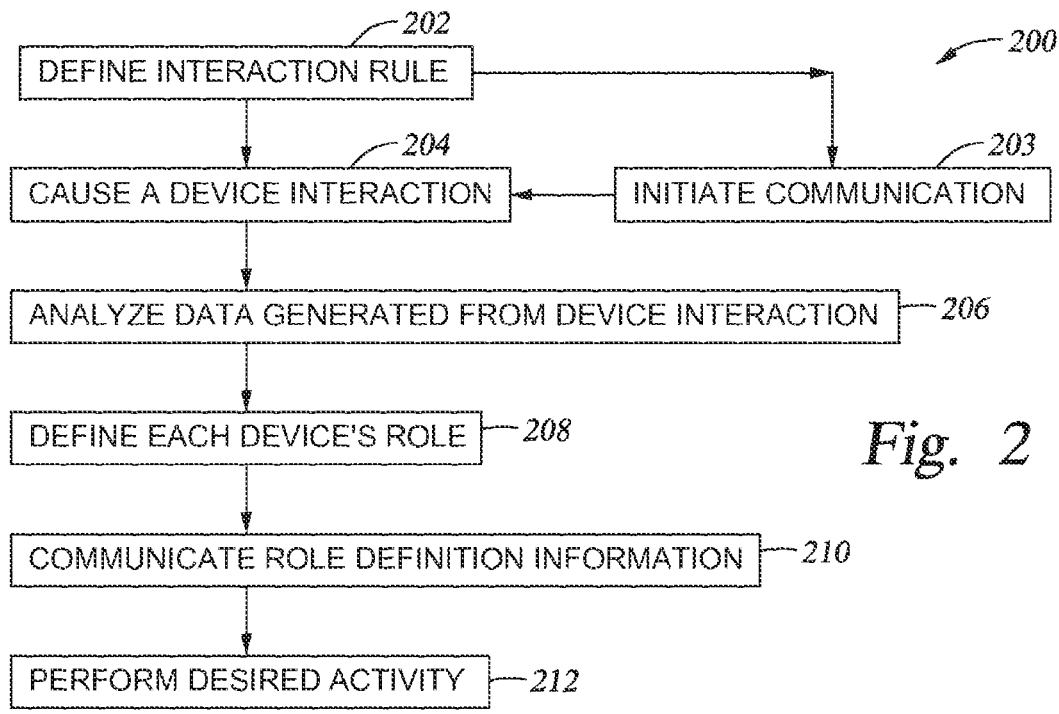
FIG. 2 is a flow diagram of a method of configuring at least one of the electronic devices illustrated in FIG. 1, according to one embodiment of the present disclosure.

FIG. 2 illustrates a process sequence 200 for configuring and/or controlling a first electronic device and/or a second electronic device based on at least the movement of the first electronic device. In one example, the first and second electronic devices are electronic devices 102A and 102B, respectively, as shown in FIG. 1. In general, the physical movement of the electronic device is part of a physical interaction process 101 (FIG. 1) that includes the steps described in the process sequence 200 below.

At step 202, the process sequence 200 starts with a user and/or the electronic device manufacturer defining one or more device control rules that are used by software running on the electronic device, such as electronic device 102A in FIG. 1, to decide how it will respond to information derived from the physical movement of the electronic device as part of a physical interaction process. In general, the device control rules include a collection of computer instructions that define how the electronic device is to interact with other devices, perform some subsequent activity, distribute desired control instructions to other devices and/or perform some other useful function. The one or more device control rules can be stored as part of the stored media data 126 retained in the memory unit 122, and can be used by one or more software applications running on the electronic device 102A. In one example, a device control rule stored in the memory unit 122 is used by the processor 118 to cause the electronic device to setup communication links with other electronic devices, help the electronic device decide which device out of multiple interacting devices is going to be a master or a slave device, decide how the electronic device is going to alter processes currently running thereon, decide what new tasks are to be performed by the electronic device, or some other useful function. When implemented by the processor 118, a device control rule, in one example, causes the electronic device 102A to act as a left speaker and the second electronic device 102B to act as the right speaker, when the two electronic devices 102A and 102B are caused to interact.

Optionally, before proceeding on to step 204, the process sequence 200 may include a step 203 in which communication between a first electronic device 102A and a second electronic device 102B is initiated. Step 203 may also include the initial "pairing" process commonly performed by wireless portable devices to allow them to securely communicate with each other via a communication link (e.g., link 135). During step 203, the electronic device 102A or electronic device 102B may generate a communication signal based on the sensed relative position of the electronic device 102A to the electronic device 102B, or by some action initiated by the user. In some embodiments, the communication signal may include pairing information, timing data, electronic device property information, and/or other useful information that will enable the performance of various elements of the process sequence 200 and/or communication between the electronic devices. As noted above, the communication link(s) may be performed via a wired or wireless communication technique (e.g., Bluetooth classic, BTLE). In some embodiments, due to information gained by either electronic device 102A, 102B, during the performance of step 203 a desired device control rule or set of device control rules may be selected and used in the subsequent steps discussed below. The desired device control rule or set of device control rules may be selected based on attributes of either of the electronic devices that are in communication with each other. Alternately in some embodiments, a device control rule is transferred from one device to the other device after step 203 has been performed. Thus, in some cases, step 203 may be started and/or completed before step 202 is completed.

Next, at step 204, the electronic device 102A is physically moved in a prescribed way, such that one or more sensors 131 in the electronic device are able to detect the electronic device's physical movement. In general, the physical movement of the electronic device 102A will have a desired amount of movement in a desired direction. In some cases, the physical movement may be associated with achieving a desired velocity and/or acceleration in a desired direction that is sensed by a sensor 131. The physical movement might be a gesture or other similar type of movement that can be recognized and interpreted by the components in the electronic device 102A as containing some desirable movement related data. In one example, the sensor 131 is used to sense the physical movement of the electronic device 102A by use of an accelerometer. The electronic device 102A may contain two or more sensors 131 that are aligned at an angle to each other, so that they can sense the movement of the electronic device in different directions. The electronic device 102A may alternately contain a single sensor 131 that is aligned in desired direction within the electronic device. In one example, a single sensor 131 is aligned in a direction that is aligned with an axis of symmetry of the electronic device 102A, such as a central axis of a cylindrical shaped electronic device. In one embodiment, the electronic device 102A contains three sensors 131 that are aligned and configured to detect the motion of the electronic device 102A in three different directions, such as three orthogonal directions, during step 204.

Figure 3:
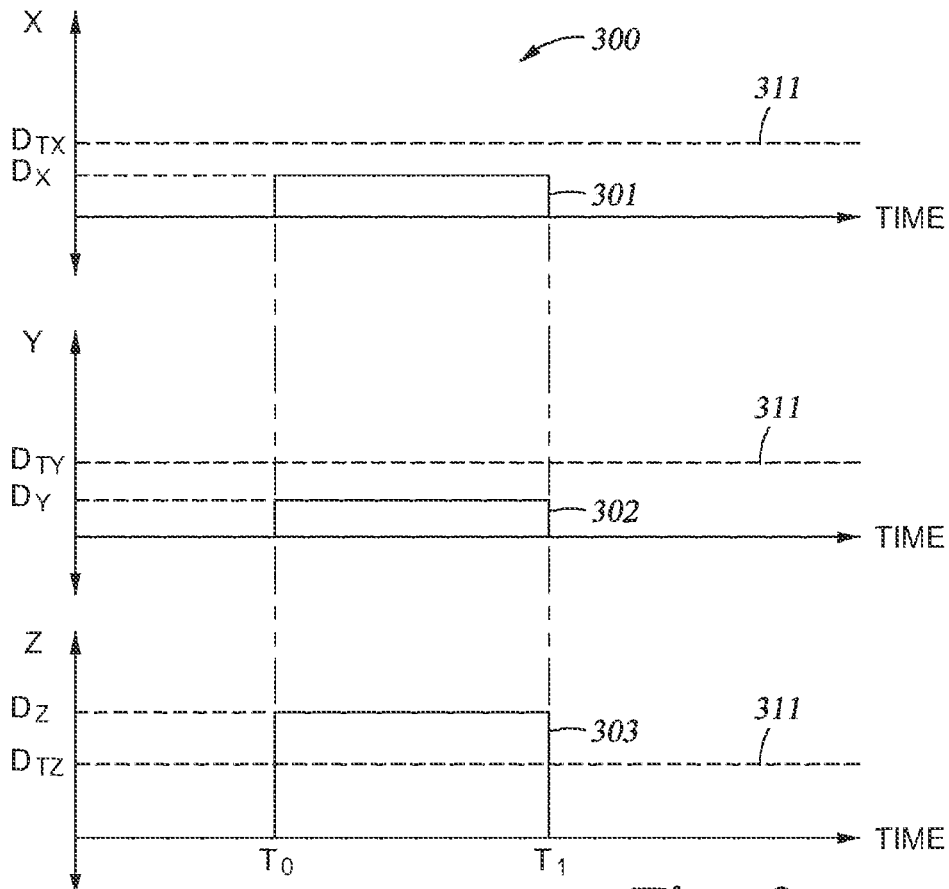
FIG. 3 illustrates a plot of a sensed physical movement of an electronic device measured along the X, Y and Z axes, according to one embodiment of the present disclosure.

FIG. 3 a plot illustrating directional components of a physical movement of an electronic device 102A applied during step 204, which is plotted along three orthogonal axes X, Y, and Z over time. The physical movement, illustrated in FIG. 3, is performed between a time $T_1$ and time $T_2$, and need not have an unvarying or constant movement profile as shown in this illustration. In this example, a motion vector 300 (e.g., an instantaneous portion of the physical movement that has a magnitude and direction), also referred to herein as a motion 300, has directional components that have a certain magnitude in each of the three orthogonal directions. However, while FIG. 3 illustrates a multi-directional motion vector, this type of movement is not intended to be limiting as to the scope of the disclosure provided herein, since in some configurations the motion vector 300 may be predominantly aligned along one direction, such as the Z-direction shown in FIG. 1.

The motion vector 300 may be created during the simple movement of the electronic device 102A in a first direction or it may be created by the impact or reaction to an impact created by the electronic device 102A "bumping" into another object, such as a second electronic device 102B. The motion vector 300, thus may include at least part of a position vector, velocity vector, acceleration vector, deceleration vector, jerk vector or impulse vector created and detected by a sensor 131, during the physical movement of the electronic device 102A. During step 204, the processor 118 in the electronic device 102A receives information about the motion vector (e.g., movement parameter information) from one or more of the sensors 131 and uses the information to decide how the electronic device 102A should react to the applied motion vector 300. The data or information generated by the sensor 131 can be delivered in the form of a signal that can be directly provided to the processor 118 for analysis, or stored in memory and then retrieved from memory by the processor 118. In some configurations, data generated by the sensor 131 is continually or regularly collected and stored in memory 122 so that when a motion vector 300 of a desired size and/or desired direction is detected, desired portions of the movement that created the motion vector 300 can be further analyzed during the process sequence 200. In some embodiments, the directional component of a motion vector 300 may be determined by sensing the movement of the electronic device using one or more sensors 131 that each have a known orientation relative to a defined reference frame by the software running within the electronic device.

In some embodiments, during step 204, the movement of the electronic device 102A is additionally sensed by a sensor 131 found in a second electronic device 102B. In this case, the sensors 131 in the electronic device 102A and electronic device 102B are each able to sense the movement of the electronic device 102A, and either separately, or by working together, are able to use this collected data to alter or adjust one or more functions, operations or processes that are subsequently performed by one or both of the electronic devices 102A, 102B. In one example, the physical interaction process 101 includes the first electronic device 102A being caused to "bump" into the second electronic device 102B. In one case, the physical interaction includes the first electronic device 102A initially moving in a first direction (e.g., −Z-direction (FIG. 1)), which after being caused to "bump" into the second electronic device 102B, causes the first electronic device 102A to move in a second direction (e.g., +Z-direction) and causes the second electronic device 102B to move in a third direction (e.g., −Z-direction). Thus, the processor 118 in each of the electronic devices is able to use the magnitude and/or direction information received from the one or more sensors 131, and/or transferred between devices, to determine how one or more subsequent processes are to be performed based on the device control rule defined in step 202.

Next, at step 206, one or more software components running on the electronic device 102 analyze the information received from the one or more of the sensors 131 to determine if the data received by the sensor meets some defined aspect of a device control rule defined in step 202. In one embodiment, the data received from application of motion vector 300 to the electronic device 102A is processed and/or compared against data stored in the memory 122 or other desirable reference (e.g., comparator circuit that compares sensor 131 signals and a reference signal). The data stored in memory 122 may include desired movement parameters, such as a desired motion vector information, desired motion vector magnitude information, desired motion vector direction information, desired motion velocity information, desired motion acceleration information, desired motion length information (e.g., time or distance) or other property of the movement process that can be measured or detected by components in the electronic device (e.g., sensors 131). The desired motion vector information may include a vector having a desired magnitude and direction that is defined relative to a reference frame defined in the electronic device 102. The desired motion vector magnitude information and desired motion vector direction information may include desired magnitude and direction values, respectively, that can each be separately compared with the motion vector 300 data provided in the signal received from the sensors 131. The desired motion velocity information and desired motion acceleration information may include desired velocity and acceleration values, respectively, that can be compared with data provided in the signal received from the sensors 131 during at least part of the interaction process. The desired motion length information may include information relating to the length of time or distance that the movement spanned during at least part of the interaction process. The stored "desired" values discussed above may also include threshold values that allow the processor 118 to decide if a motion imparted on the electronic device 102 is intended to cause the electronic device to alter its current operation based on the sensed movement, or if the movement was an unintentional movement. In one example, as illustrated in FIG. 3, the motion 300 includes an X-component that has a magnitude $D_X$ that is less than a threshold value $D_{TX}$, a Y-component that has a magnitude $D_Y$ that is less than is less than a threshold value $D_{TY}$, and a Z-component that has a magnitude $D_Z$ that is greater than a threshold value $D_{TZ}$, which are sensed by electrical components 103 in an electrical device 102. During step 206, the processor 118 can use the data obtained from the sensed motion 300, so that it can determine, in this case, that the motion 300 is primarily in the Z-direction and it is of a size that exceeds a "desired" threshold value. The processor can then use the information contained in any stored movement information and stored device control rule to decide how the electronic device should respond to the received data, as discussed below.

Next, at step 208, the components in the electronic device 102 define device control process instructions that are to be subsequently performed by the electronic device based on the analysis performed during step 206. Based on the receipt and analysis of the data generated during steps 204-206, the processor 118 will make a decision regarding how subsequent processes will be performed on the electronic device by following the instructions based on the information contained in the device control rule stored in memory and/or information relating to the electronic device's movement that is received from the sensor(s) 131. The instructions contained in the device control rule may include multiple conditional expressions or conditional statements, such as "If-then" type statements, which define what device control process instructions are to be used when a physical movement of a desired type is detected by the sensor(s) during steps 204-206. The device control process instructions are thus used to help the software running on the electronic device define how the electronic device will subsequently operate or what processes will be subsequently performed by the electronic device. In one example, the device control process instructions can be used to alter the operation of a selected software application running on the electronic device such that it affects the activities running on the device (e.g., signal or data processing activities), the way that the software delivers input to the user (e.g., GUI display changes or alters provided audio data) and/or the way that the software application receive input from the user. Thus, in general, the device control process includes the process of defining the primary control function, or mode of operation, that the electronic device 102 is to subsequently perform.

Next, at step 210, the electronic device 102 may optionally generate one or more device control signals based on the sensed movement of the electronic device 102A and decisions made during step 208. The one or more device control signals are generally broadcast by the electronic device 102A using the transceiver 120. The device control signal may be sent to an external electronic device via a communication link. In one example, the device control signal may be sent to the electronic device 102B or secondary device 105 via the communication link 135 or communication link 140, respectively. In cases where there are multiple electronic devices within communication range of the electronic device 102A, the broadcast signal may also be sent to the other external electronic devices via separate communication links. As noted above, the communication link(s) may be performed via a wired or wireless communication technique (e.g., Bluetooth classic, BTLE). In cases where step 203 is not performed, step 210 may also include the initial pairing process commonly performed by wireless portable devices to allow them to securely communicate with each other.

The device control signals broadcast by the electronic device 102A during step 210 may contain information about the electronic device, the electronic device's primary control function, timing data and/or other useful information. In some configurations, the primary control function information can include information relating to the electronic device's local environment and/or its desired primary control function. A device's primary control function, which can be performed by certain software applications running on the device, includes a predetermined mode of operation that the electronic devices and/or portable device are to subsequently perform. The primary control function information provided by the electronic device 102A can be used to select certain software applications that are to be run within the electronic device 102B or secondary device 105, such as audio producing programs. Other examples of primary control function information include information that is used by the electronic device 102B to alter the operation of a selected software applications running on thereon, as similarly discussed above. In one example, when the electronic device 102B, or secondary device 105, is running an audio application, the received information is used to alter the equalization settings, volume settings, or sound modulation settings of the electronic device to alter the playback of audio data delivered to the user. In another example, when the electronic device 102B, or secondary device 105, is configured to perform home automation type activities, the received information can be used to alter which device it will communicate with or help define the set of control signals that are to be sent out to the other devices that it is in communication with currently.

In some embodiments, the delivered primary control function information may at least include a device identifier code that contains information relating to the electronic device 102A. The device identifier code information may be used by the software running on the electronic device (e.g. electronic device 102B or secondary device 105) to decide what type(s) of controlling software should be run on the electronic device to perform its desired primary control function. In some configurations, the software running on the electronic device 102B or the secondary device 105 is used to compare the received identifier code with a table of identifier code information and other related information stored in the memory of the electronic device 102B or the secondary device 105, so that the device can adjust its operation to better communicate with the electronic device 102A and/or perform its primary control function.

Also, in some embodiments, the timing data delivered within the device control signal is used by the processor in a receiving electronic device (e.g., second electronic device) to make a decision whether to alter its current operation and/or perform some subsequent processes, as discussed in step 212 below. In one configuration, the received timing data is compared with timing data generated by a clock within the receiving electronic device to determine if the device control signal was intended to cause the receiving device to alter its current operation and/or perform some subsequent process. In one example, if the received timing data is within a desired timing window, which was initiated by a sensed physical movement of the receiving electronic device, then the processor within the receiving device can determine that the received device control signal was intended to be used by it. However, if a device control signal is received and the received timing data is outside of a set timing window, or if no timing window was initiated by the receiving device's processor (e.g., no sensed physical movement of a desired magnitude and/or direction), then the receiving electronic device can decide that the received device control signal was not intended to be used by it, and thus no processes will be altered or initiated by the receiving electronic device. The timing data generated within an electronic device, may be generated due to a sensed physical movement of the electronic device. As noted above, timing data may include data transfer time stamp information, timing window information, time information relating to a sensed physical movement, or other useful timing data that can be used during processing sequence 200. In general, the timing window may be generated by use of the clock, processor and/or software found within each electronic device, and may have a desired preprogrammed length. Timing window information, such as when the timing window was initiated and its time related attributes, may be communicated between electronic devices using one or more of the communication signals (e.g., device control signals, etc.) and communication links which are discussed above. The generation, transfer and/or analysis of timing data between or within electronic devices can be used to prevent false interactions or unintentional physical movements from undesirably altering or initiating processes on an electronic device.

Next, at step 212, the electronic device 102A, the electronic device 102B, and/or the secondary device 105 initiate or alter some desired operation or activity being performed thereon based on the input received during the completion of steps 202-210. In some embodiments, the desired process or activity performed by the electronic device 102A, the electronic device 102B, and/or the secondary device 105 may be include performing some consumer electronics related function or operation, such as act as a music player, alarm clock, user's health tracking device, home automation control, automobile component control or other useful residential or business applications based on the electronic device's physical movement. Some examples of desired processes or activities that may be performed by the one or more of the electronic devices include: starting an application or a function that is to be run or is running on one of the devices; recording a status or a state of either device at an instant in time; turning on or off indicator lights shown one or more of the devices; sending a notification through an electronic means (e.g., send email, text or other data); and controlling some aspect of music and/or video delivered by one of the devices. In some embodiments, the desired processes or activities may be used to control some aspect of the user's experience in an automobile or other similar setting. For example, some desired processes or activities that may be controlled include: controlling some aspect of a heating/cooling system that is in communication with the device (e.g., automobile temperature control system that is coupled to the secondary device 105); controlling the locking/unlocking of an automobile door, controlling the ignition of the automobile, and changing volume level with the automobile.

In some configurations, after the device control signals has been broadcasted by the electronic device 102A (e.g., after step 210) the receiving device, such as electronic device 102B or secondary device 105, may optionally generate one or more confirmation signals that are transmitted to the electronic device 102A. The one or more confirmation signals are generally broadcast by the receiving device using a communication link. The one or more confirmation signals broadcast by the electronic device 102B or secondary device 105 may contain information about the receiving device, the receiving device's primary control function, receiving device's timing data type information, a message that the device control signal was received and/or other useful information.

Figure 4:
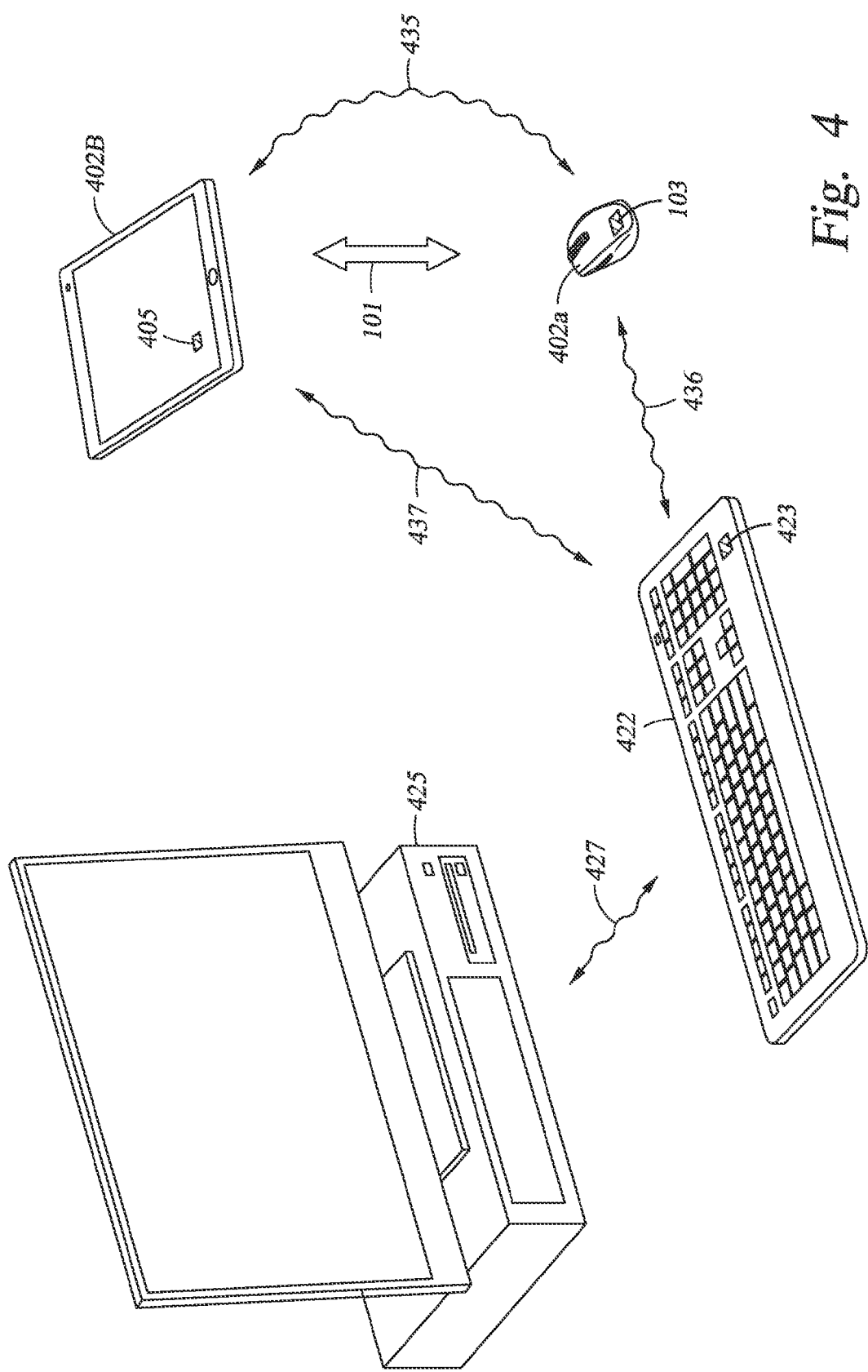
FIG. 4 schematically illustrates an example of two electronic devices that have been caused to interact with each other, according to one embodiment of the present disclosure.

FIG. 4 illustrates an electronic device 402A that is caused to interact with a second electronic device 402B. In one configuration, the electronic device 402A is adapted to communicate with the electronic device 402B, according to the physical interaction process 101. In this example, the electronic device 402A is a wireless mouse and the electronic device 402B is a computing device, such as a tablet or laptop computer. The physical interaction process 101 enables the electronic device 402A to act as a mouse configured to provide input to the electronic device 402B via a communication link 435. In this case, the setup, communication and definition of the roles between the electronic devices 402A and 402B can be created by a specific movement of the either the electronic device 402A or the electronic device 402B. In one example, when the user causes the electronic device 402A to "bump" into the electronic device 402B in a vertical direction (e.g., +Z or −Z-direction), the electronic device 402A uses this movement to determine, based on a device control rule, that it is to wirelessly communicate with the electronic device 402B. The decision to specifically interact with the electronic device 402B can be made using information in the device control rule, and/or can be related to the position of the electronic device 402A relative to the electronic device 402B when the "bump" occurs. The position of the electronic device 402A relative to the electronic device 402B when the "bump" occurs can be determined using the wireless signal strength comparison device and memory unit discussed above. In one example, the wireless signal strength comparison device may include components that are able to detect the power level of the signals received from the multiple electronic devices that are within communication range of the electronic device 402A, and determine which signal is the strongest. In general, since the electronic device 402B is positioned such that it is in close proximity to the electronic device 402A during the physical interaction process 101, the processor 118 in the electronic device 402A will determine that the electronic device 402B is the closest device based on its relatively high signal strength level. Based on the received signal strength information, the processor 118 may decide that the electronic device 402B is the one that should be communicated with going forward.

In some embodiments, the electronic device 402A is adapted to communicate with the electronic device 402B through a third electronic device 422 via two or more communication links 436 and 437, during or after the physical interaction process 101 has been completed. In this case, the third electronic device 422 acts as an intermediary between the electronic device 402A and the electronic device 402B, since the third electronic device 422 is configured to or is better able to communicate with the electronic device 402B than the electronic device 402A. The benefit of having an intermediary device may be created by the hardware or software capabilities of the third electronic device 422 and/or advantages created by the physical position of the electronic device 422 relative to the electronic device 402B. In some embodiments, the third electronic device 422 is further adapted to communicate with other electronic devices, such as a computing device 425 via a communication link 427. In this case, the physical interaction process 101 may cause the electronic device 402A to end its communication process with the computing device 425 and/or the third electronic device 422 and directly or indirectly start communication with the electronic device 402B.

Therefore, by use of one or more of the processing sequence steps, various different types of physical movements of an electronic device can be used to setup, configure and/or control the electronic device and other electronic devices that are part of the physical interaction process 101. In one example, imparting a physical movement of a certain size in a desired direction (e.g., −X-direction), or causing electronic device 102A to physically interact with a second device 102B, causes the electronic device 102A to perform a first type of operation, while physically moving the first electronic device 102A in a second direction (e.g., +X-direction or −Z-direction) may cause the electronic to perform a second type of operation.

In an audio electronic device example, physically moving a first electronic device 102A in a desired direction (e.g., −X-direction), or causing it to physically interact with a second device 102B by use of a physical movement of a certain size in the desired direction, causes the electronic device to alter some aspect of its play back capability and/or a second electronic devices playback capability. The alteration of the audio playback capability may include adjustment of equalization settings, volume settings, sound modulation settings, a low-frequency cutoff parameter, a crossover cutoff parameter, and other device function settings, such as whether the electronic device is a master or slave speaker, and/or whether the electronic device has some desired role within an audio playback delivery system. Audio playback delivery systems may include a simple two component wireless speaker system or a more complicated system, such as a 5.1 or a 10.2 surround sound system. Examples of desired roles within an audio playback delivery system may include whether the electronic device is a left or right speaker, whether the electronic device is to provide sound in a desired frequency range (e.g., sub-woofer, mid-range speaker, etc.), and whether the electronic device is or is not a surround sound providing speaker.

In a home electronic device example, imparting a physical movement of a certain size in a desired direction on a first electronic device 102A, and/or causing the first electronic device 102A to physically interact with a second device 102B, causes the electronic device to alter some aspect of the way the electronic device functions in the home environment. In one example, where the electronic device is a remote used in the home environment, the alteration of the devices function or capability may include the adjustment of the remotes programmed settings, for example, what other home device (e.g., television, alarm system, stereo) it is to communicate with going forward.

In some embodiments, repeated physical movement of an electronic device in the same or multiple directions over a desired period of time will cause the electronic device to perform part of the physical interaction process 101 to further adjust and/or desirably alter its activities. In one configuration, by repeatedly moving the first electronic device 102A in back-and-forth motion along a line aligned to a first direction (e.g., line extending in the −X and +X-directions) different modes of operation are serially selected by the processor 118 due to the imparted motion. For example, if the first electronic device 102A is a wireless audio speaker, by repeatedly moving the first electronic device 102A along a first direction at least three times will cause the device to first initiate the pairing process the first time the motion is performed, then second decide whether the audio speaker is to provide the sound by stereo or mono type sound reproduction the second time the motion is performed, and then third decide whether it should output audio data as a right or left speaker the third time the motion is performed.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. An electronic device, comprising:
 a processor;
 a transceiver;
 a first sensor that is configured to generate a first signal when the electronic device is moved in a first direction, wherein the first signal comprises movement parameter information; and
 a memory having stored therein a number of instructions which, when executed by the processor, causes the electronic device to perform operations comprising:
 comparing the first signal, received from the first sensor, with a device control rule, wherein the device control rule is associated with movement of the electronic device in the first direction;
 initiating or altering an operation performed by the electronic device based on information generated by the comparison of the first signal with the device control rule; and
 transmitting a device control signal, using the transceiver, to an external electronic device, wherein the device control signal is derived from information generated by the comparison of the first signal generated from movement of the electronic device in the first direction with the device control rule, which is associated with movement of the electronic device in the first direction,
 wherein initiating or altering the operation performed by the electronic device causes the electronic device to act as an intermediary which transfers communication signals between a first external electronic device and a second external electronic device.

2. The electronic device of claim 1, further comprising a second sensor that is configured to generate a second signal when the electronic device is moved in a second direction, wherein the second signal comprises information related to a movement parameter that is detected by the second sensor, and the second direction is at an angle to the first direction.

3. The electronic device of claim 1, wherein the movement parameter information comprises information relating to an acceleration of the electronic device in the first direction.

4. The electronic device of claim 1, wherein the movement parameter information comprises a magnitude of a movement parameter in the first direction.

5. The electronic device of claim 1, wherein
 the transceiver comprises a wireless transceiver that is in communication with the processor, and
 the memory also having stored therein a number of instructions which, when executed by the processor, causes the electronic device to perform operations comprising:
 receiving a wireless signal from the first external electronic device;
 measuring a signal strength of the wireless signal; and
 communicating with the first external electronic device based on the measured wireless signal strength.

6. The electronic device of claim 1, further comprising a signal strength comparison device that is configured to measure an electrical characteristic of a wireless signal that is received by the transceiver.

7. The electronic device of claim 1, wherein
 the transceiver comprises a wireless transceiver that is in communication with the processor, and the memory also having stored therein a number of instructions which, when executed by the processor, causes the electronic device to perform operations comprising:
  retrieving electronic device information stored in memory; and
  transmitting the retrieved electronic device information using the wireless transceiver.

8. A method of controlling an electronic device, comprising:
  receiving, by a processor, a first signal from a first motion sensor, wherein the first signal comprises information relating to a movement parameter that has a magnitude in a first direction;
  defining a device control process instruction based on a comparison of the information in the first signal and a device control rule, wherein the device control rule is associated with movement of the electronic device in the first direction;
  initiating or altering a process performed by the electronic device based on the defined device control process instruction; and
  transmitting, by a transceiver, a device control signal to an external electronic device, wherein the device control signal is derived from information generated by the comparison of the first signal generated from movement of the electronic device in the first direction with the device control rule which is associated with movement of the electronic device in the first direction, and
  wherein the initiated or altered process performed by the electronic device includes the electronic device acting as an intermediary between a first external electronic device and a second external electronic device.

9. The method of claim 8, wherein
  while receiving the first signal also receiving a second signal from a second motion sensor, wherein the second signal comprises information relating to a movement parameter that has a magnitude in a second direction, and the second direction is at an angle to the first direction, and
  the process of defining the device control process instruction further comprises comparing the information in the second signal and the device control rule.

10. The method of claim 8, further comprising after defining the device control process instructions:
  receiving, by the processor, a second signal from the first motion sensor, wherein the second signal comprises information relating to a movement parameter that has a magnitude in the first direction or a second direction, which is at an angle to the first direction; and
  altering the device control process instruction based on a comparison of the information in the second signal and the device control rule.

11. The method of claim 8, further comprising:
  transmitting information to the first external electronic device, wherein the information comprises the device control process instruction and timing data; and
  initiating or altering a process performed by the first external electronic device based on the transmitted device control process instruction and timing data.

12. The method of claim 8, further comprising forming a communication link between the electronic device and the first external electronic device, wherein the communication link comprises a wireless communication link.

13. The method of claim 8, wherein initiating or altering the process performed by the electronic device further comprises performing a pairing process.

14. The method of claim 8, further comprising receiving, at the electronic device, a first communication signal from the first external electronic device before receiving the first signal.

15. The method of claim 8, further comprising
  receiving, by the processor, a second signal from the first motion sensor, wherein the second signal comprises information relating to a movement parameter that has a magnitude in the first direction or a second direction;
  defining a subsequent device control process instruction based on a comparison of the information in the second signal and the device control rule; and
  initiating or altering a process performed by the electronic device using the subsequent device control process instruction.

16. A method of controlling a first electronic device, comprising:
  sensing a first movement of a first electronic device using a first sensor, wherein the sensed first movement comprises detecting a magnitude of the first movement in a first direction;
  receiving, by a processor, information relating to the sensed first movement;
  sensing a second movement of the first electronic device using the first sensor, wherein the sensed second movement comprises detecting a magnitude of the second movement in the first direction, and the second movement occurs after the first movement;
  receiving, by the processor, information relating to the sensed second movement;
  defining a device control process based on a comparison of the information received from the first and second movements and a device control rule; and
  initiating or altering a process performed by the first electronic device based on the defined device control process derived from the comparison, wherein the initiated or altered process performed by the first electronic device includes the first electronic device acting as an intermediary between a first external electronic device and a second external electronic device.

17. The method of claim 16, further comprising:
  sensing the movement of the first electronic device using a second sensor, wherein the sensed movement comprises detecting a magnitude of the movement in a second direction, and the second direction is at an angle to the first direction.

18. The method of claim 16, further comprising:
  transmitting timing information and device control process information to the first external electronic device; and
  initiating or altering a process performed by the first external electronic device based on the timing information and the defined device control process information.

19. The method of claim 16, further comprising forming a communication link between the first electronic device and the first external electronic device, wherein the communication link comprises a wireless communication link.

20. The method of claim 16, wherein initiating or altering the process performed by the first electronic device comprises performing a pairing process.

21. The method of claim 16, further comprising receiving, at the first electronic device, a first communication signal from the first external electronic device before sensing the first movement.

22. The method of claim 21, further comprising measuring a signal strength of the first communication signal.

23. The electronic device of claim 1, wherein transmitting the device control signal to the first external electronic device comprises transmitting signals to initiate a pairing process between the electronic device and the first external electronic device.

24. The method of claim 8, wherein transmitting the device control signal to the first external electronic device comprises transmitting signals to initiate a pairing process between the electronic device and the first external electronic device.

25. The electronic device of claim 1, wherein
the electronic device is an audio speaker, and
initiating or altering the operation performed by the electronic device causes the electronic device to act a right or left audio speaker.

26. The method of claim 8, wherein
the second external electronic device is an audio speaker, and
the device control signal transmitted to the second external electronic device causes the second external electronic device to act a right or left audio speaker.

27. The method of claim 16, wherein
the first electronic device is an audio speaker, and
initiating or altering the process performed by the first electronic device causes the first electronic device to act a right or left audio speaker.

* * * * *